(12) United States Patent
Igarashi

(10) Patent No.: US 10,421,398 B2
(45) Date of Patent: Sep. 24, 2019

(54) DRIVING-ASSISTANCE DEVICE AND DRIVING-ASSISTANCE METHOD

(71) Applicant: TOYOTA JIDOSHA KABUSHIKI KAISHA, Toyota-shi, Aichi (JP)

(72) Inventor: Shinji Igarashi, Susono (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 0 days.

(21) Appl. No.: 14/436,540

(22) PCT Filed: Nov. 21, 2012

(86) PCT No.: PCT/JP2012/080215
§ 371 (c)(1),
(2) Date: Apr. 17, 2015

(87) PCT Pub. No.: WO2014/080484
PCT Pub. Date: May 30, 2014

(65) Prior Publication Data
US 2015/0329046 A1    Nov. 19, 2015

(51) Int. Cl.
*B60Q 9/00* (2006.01)
*H04N 13/254* (2018.01)
*G08G 1/16* (2006.01)

(52) U.S. Cl.
CPC .......... *B60Q 9/008* (2013.01); *G08G 1/165* (2013.01); *G08G 1/166* (2013.01); *G08G 1/167* (2013.01); *H04N 13/254* (2018.05)

(58) Field of Classification Search
CPC ........ B60Q 9/008; G08G 1/165; G08G 1/166; G08G 1/167; H04N 13/0253
See application file for complete search history.

(56) References Cited

U.S. PATENT DOCUMENTS 4,917,206 A * 4/1990 Hara .................... B60K 31/047
                                                    180/176
5,854,987 A * 12/1998 Sekine .................... B62D 1/28
                                                    180/443
(Continued)

FOREIGN PATENT DOCUMENTS

DE    102005002760 A1 *  8/2005  ............... B60T 7/22
JP       05196735 A   *  8/1993
(Continued)

*Primary Examiner* — Steven Lim
*Assistant Examiner* — Muhammad Adnan
(74) *Attorney, Agent, or Firm* — Sughrue Mion, PLLC

(57) ABSTRACT

A driving-assistance device 100 makes it a condition for implementing driving assistance for collision avoidance that a normal travel area AR is set in the vicinity of a host vehicle, and that an unavoidable obstacle D is present within the normal travel area AR. Particularly, in the driving-assistance device 100, a degree of width W of the normal travel area AR is set in accordance with a rule based on a type or the like of the obstacle D. For this reason, a timing at which a collision with the obstacle D cannot be avoided within the normal travel area AR (timing at which a condition for implementing driving assistance for collision avoidance is established) becomes variable in accordance with the type or the like of the obstacle D. Thus, it is possible to implement the driving assistance for collision avoidance more appropriate to a driver's intuition.

8 Claims, 10 Drawing Sheets

(56) References Cited

U.S. PATENT DOCUMENTS

| | | | | |
|---|---|---|---|---|
| 6,031,484 A * | 2/2000 | Bullinger | | B60R 21/013 340/436 |
| 6,259,992 B1 * | 7/2001 | Urai | | B60K 31/0008 701/301 |
| 6,269,307 B1 * | 7/2001 | Shinmura | | B60Q 9/008 340/435 |
| 6,269,308 B1 * | 7/2001 | Kodaka | | B62D 15/0265 340/435 |
| 6,510,388 B1 * | 1/2003 | Sporrong | | G08G 5/045 342/455 |
| 6,975,246 B1 * | 12/2005 | Trudeau | | B60T 7/22 180/167 |
| 7,729,841 B2 * | 6/2010 | Knoop | | B60T 7/22 180/179 |
| 7,885,766 B2 * | 2/2011 | Sugimoto | | G08G 1/167 701/26 |
| 7,983,836 B2 * | 7/2011 | Breed | | G08G 1/161 340/441 |
| 8,155,856 B2 * | 4/2012 | Sekiguchi | | B60W 30/16 340/435 |
| 8,296,006 B2 * | 10/2012 | Yamaguchi | | B60C 23/0416 340/426.33 |
| 8,330,592 B2 * | 12/2012 | von Zeppelin | | B60W 30/16 340/435 |
| 8,760,276 B2 * | 6/2014 | Yamazato | | G08G 1/166 340/435 |
| 8,862,383 B2 * | 10/2014 | Tsuchida | | G01S 13/72 180/169 |
| 9,135,798 B2 * | 9/2015 | Sakagami | | G08G 1/166 |
| 9,196,162 B2 * | 11/2015 | Igarashi | | G08G 1/165 |
| 9,493,114 B2 * | 11/2016 | Takahashi | | B60Q 7/005 |
| 9,542,824 B2 * | 1/2017 | Beggs | | B60Q 1/2673 |
| 2003/0067219 A1 * | 4/2003 | Seto | | B60T 7/22 303/193 |
| 2004/0145238 A1 * | 7/2004 | Seto | | B60T 7/22 303/193 |
| 2004/0193351 A1 * | 9/2004 | Takahashi | | B60T 7/22 701/70 |
| 2005/0073438 A1 * | 4/2005 | Rodgers | | G08G 1/161 340/944 |
| 2005/0240335 A1 * | 10/2005 | Schroder | | B60K 31/0008 701/96 |
| 2005/0267683 A1 * | 12/2005 | Fujiwara | | B60T 8/17558 701/301 |
| 2006/0282218 A1 * | 12/2006 | Urai | | G08G 1/166 701/301 |
| 2007/0050114 A1 * | 3/2007 | Koike | | B60W 30/08 701/45 |
| 2007/0106475 A1 * | 5/2007 | Kondoh | | B60K 26/021 701/301 |
| 2007/0288133 A1 * | 12/2007 | Nishira | | G05D 1/0214 701/23 |
| 2008/0097699 A1 * | 4/2008 | Ono | | B60R 21/0134 701/300 |
| 2008/0189040 A1 * | 8/2008 | Nasu | | G08G 1/163 701/301 |
| 2008/0243389 A1 * | 10/2008 | Inoue | | G08G 1/165 701/301 |
| 2009/0099727 A1 * | 4/2009 | Ghoneim | | B60W 40/08 701/36 |
| 2009/0143951 A1 * | 6/2009 | Takahashi | | B60W 30/02 701/70 |
| 2009/0228174 A1 * | 9/2009 | Takagi | | B60T 8/17558 701/41 |
| 2010/0004827 A1 * | 1/2010 | Imamura | | B60R 21/0134 701/45 |
| 2010/0030426 A1 * | 2/2010 | Okita | | B60T 7/22 701/41 |
| 2010/0030474 A1 * | 2/2010 | Sawada | | B62D 15/0265 701/301 |
| 2010/0049375 A1 * | 2/2010 | Tanimoto | | B60T 7/12 701/1 |
| 2010/0217528 A1 * | 8/2010 | Sato | | B25J 9/1666 701/301 |
| 2011/0128138 A1 * | 6/2011 | Yamamoto | | B60W 30/0956 340/436 |
| 2011/0178710 A1 * | 7/2011 | Pilutti | | B60T 7/22 701/301 |
| 2012/0133769 A1 * | 5/2012 | Nagamine | | B60R 1/00 348/148 |
| 2012/0313523 A1 * | 12/2012 | Futamura | | B60Q 1/143 315/79 |
| 2013/0040655 A1 * | 2/2013 | Keidar | | H01Q 1/245 455/456.1 |
| 2014/0148989 A1 * | 5/2014 | Ueda | | G05D 1/024 701/23 |
| 2014/0257593 A1 | 9/2014 | Igarashi | | |
| 2016/0200317 A1 * | 7/2016 | Danzl | | B60K 28/06 701/25 |

FOREIGN PATENT DOCUMENTS

| | | |
|---|---|---|
| JP | 07-149193 A | 6/1995 |
| JP | 2007-186175 A | 7/2007 |
| JP | 2010-030398 A | 2/2010 |
| JP | 2010030398 A * | 2/2010 |
| JP | 2011-005893 A | 1/2011 |
| WO | 2013/046298 A1 | 4/2013 |

* cited by examiner

DRIVING-ASSISTANCE DEVICE AND DRIVING-ASSISTANCE METHOD

CROSS REFERENCE TO RELATED APPLICATIONS

This application is a National Stage of International Application No. PCT/JP2012/080215 filed Nov. 21, 2012, the contents of all of which are incorporated herein by reference in their entirety.

TECHNICAL FIELD

The present invention relates to a driving-assistance device and a driving-assistance method.

BACKGROUND ART

Patent Literature 1 discloses a vehicle collision prevention device that executes a collision prevention process when a relative distance between a host vehicle and an object in front is set to be equal to or less than a predetermined safety distance. This vehicle collision prevention device detects a tire abnormality of a host vehicle or the grade of a traveling road of a host vehicle, and determines a predetermined safety distance on the basis of the detection results.

CITATION LIST

Patent Literature

[Patent Literature 1] Japanese Unexamined Patent Application Publication No. 7-149193

SUMMARY OF INVENTION

Technical Problem

Incidentally, in the aforementioned technique, when driving assistance for collision avoidance is implemented in spite of a collision between a host vehicle and a three-dimensional object being able to be avoided by a normal driving operation of a driver, the driver may feel troubled. The inventor has obtained the following knowledge through assiduous research in view of such a situation.

That is, when it is made a condition for implementing collision avoidance assistance that a predetermined range including a course of the host vehicle is set, and that a collision between the host vehicle and the target object cannot be avoided within the predetermined setting range, that is, when driving assistance for avoiding a collision between the host vehicle and the three-dimensional object is implemented on a condition that an unavoidable three-dimensional object is present within the predetermined range including a course of the host vehicle, it is possible to prevent a driver from feeling troubled through the implementation of driving assistance. According to such knowledge, it is possible to implement driving assistance for collision avoidance appropriate to a driver's intuition by preventing the driver from feeling troubled. In this manner, in a technique for driving assistance relating to collision avoidance, it is preferable to realize driving assistance more appropriate to a driver's intuition.

Consequently, an object of the present invention is to provide a driving-assistance device and a driving-assistance method which are capable of implementing driving assistance for collision avoidance more appropriate to a driver's intuition.

Solution to Problem

In order to solve the above-mentioned problem, the inventor has performed further research, and has attained the following new knowledge. The new knowledge means that since a sense of danger of a collision with the three-dimensional object which is felt by a driver varies with the state (such as, for example, moving state or type) of the three-dimensional object, timings at which the driver attempts to avoid the collision are different from each other. According to such new knowledge, when the timing of driving assistance for collision avoidance is made variable in accordance with the state of the three-dimensional object, it is considered to be possible to implement driving assistance for collision avoidance more appropriate to a driver's intuition. The present invention is contrived on the basis of such new knowledge.

That is, according to the present invention, there is provided a driving-assistance device in which, when a three-dimensional object is present on a course of a host vehicle, driving assistance for avoiding a collision between the host vehicle and the three-dimensional object is implemented on a condition that an unavoidable three-dimensional object is present in a predetermined range including the course, the driving-assistance device including: setting means configured to set the predetermined range in the vicinity of the host vehicle, wherein the setting means sets a degree of width of the predetermined range in accordance with a predetermined rule which is set in advance on the basis of at least one of a moving state and a type of the three-dimensional object.

In addition, according to the present invention, there is provided a driving-assistance method in which, when a three-dimensional object is present on a course of a host vehicle, driving assistance for avoiding a collision between the host vehicle and the three-dimensional object is implemented on a condition that an unavoidable three-dimensional object is present in a predetermined range including the course, the driving-assistance method including: a setting step of setting the predetermined range in the vicinity of the host vehicle, wherein in the setting step, a degree of width of the predetermined range is set in accordance with a rule which is set in advance on the basis of at least one of a moving state and a type of the three-dimensional object.

In the driving-assistance device and the driving-assistance method, driving assistance for avoiding a collision between the host vehicle and the three-dimensional object is implemented on a condition that an unavoidable three-dimensional object is present in the predetermined range including a course of the host vehicle (that is, within the predetermined range which is set in the vicinity of the host vehicle, impossibility of a collision avoidance between the host vehicle and the three-dimensional object is set as a condition for implementing the driving assistance for collision avoidance). Therefore, it is possible to prevent a driver from feeling troubled, and to implement driving assistance for collision avoidance appropriate to a driver's intuition. Particularly, in the driving-assistance device and the driving-assistance method, the degree of width of the predetermined range is set in accordance with a rule based on the moving state or the type of the three-dimensional object. For this reason, the timing at which a collision between the host vehicle and the three-dimensional object cannot be avoided within the predetermined range (that is, timing at which a condition for implementing the driving assistance for collision avoidance is established) becomes variable in accordance with the moving state or the type of the three-dimensional object. Thus, according to the driving-assistance device and the driving-assistance method, it is possible to implement the driving assistance for collision avoidance more appropriate to a driver's intuition.

Here, it is considered that the driver feels more risk as the speed of approach between the host vehicle and the three-dimensional object becomes higher. Consequently, in the driving device according to the present invention, the setting means can set the degree of width to become smaller as a speed of approach between the host vehicle and the three-dimensional object becomes higher. In this manner, when the degree of width of the predetermined range is set to become smaller as the speed of approach between the host vehicle and the three-dimensional object becomes higher, the timing at which the condition for implementing the driving assistance for collision avoidance is established becomes earlier, and thus it is possible to implement driving assistance for collision avoidance still more appropriate to a driver's intuition.

In addition, it is considered that the driver feels more risk as the absolute movement velocity of the three-dimensional object becomes higher. Consequently, in the driving-assistance device according to the present invention, the setting means can set the degree of width to become smaller as an absolute movement velocity of the three-dimensional object becomes higher. In this manner, when the degree of width of the setting range is set to become smaller as the absolute movement velocity of the three-dimensional object becomes higher, the timing at which the condition for implementing the driving assistance for collision avoidance is established becomes earlier, and thus it is possible to implement driving assistance for collision avoidance still more appropriate to a driver's intuition.

In addition, it is considered that the driver feels more risk in a case where the three-dimensional object is a moving object than being a stationary object. Consequently, in the driving-assistance device according to the present invention, the setting means can set the degree of width to be relatively smaller in a case where the three-dimensional object is a moving object than in a case where the three-dimensional object is a stationary object. In this manner, when the degree of width of the predetermined range is set to be relatively smaller in a case where the three-dimensional object is a moving object than being a stationary object, the timing at which the condition for implementing the driving assistance for collision avoidance is established becomes earlier, and thus it is possible to implement driving assistance for collision avoidance still more appropriate to a driver's intuition.

In addition, it is considered that the driver feels more risk in a case where the three-dimensional object is a vehicle than being a person or a two-wheeled vehicle. Consequently, in the driving-assistance device according to the present invention, the setting means can set the degree of width to be relatively smaller in a case where the three-dimensional object is a vehicle than in a case where the three-dimensional object is a person or a two-wheeled vehicle. In this manner, when the degree of width of the predetermined range is set to be relatively smaller in a case where the three-dimensional object is a vehicle than being a person or a two-wheeled vehicle, the timing at which the condition for implementing the driving assistance for collision avoidance is established becomes earlier, and thus it is possible to implement driving assistance for collision avoidance still more appropriate to a driver's intuition.

Further, it is considered that the driver feels more risk in a case where the three-dimensional object is an oncoming vehicle. Consequently, in the driving-assistance device according to the present invention, the setting means can set the degree of width to be relatively smaller in a case where the three-dimensional object is an oncoming vehicle than in a case where the three-dimensional object is not an oncoming vehicle. In this manner, when the degree of width of the predetermined range is set to be relatively smaller in a case where the three-dimensional object is an oncoming vehicle, the timing at which the condition for implementing the driving assistance for collision avoidance is established becomes earlier, and thus it is possible to implement driving assistance for collision avoidance still more appropriate to a driver's intuition.

In the driving-assistance device according to the present invention, the setting means can set a travel range of the host vehicle which is specified by a plurality of travel routes along which the host vehicle is capable of traveling when the current momentum of the host vehicle is increased or decreased by the amount of variation in momentum, as the predetermined range, and can change the degree of width by changing the amount of variation in momentum. In this case, a change in the degree of width of the travel range according to the predetermined rule is facilitated. Meanwhile, examples of the "momentum" to be used herein can include, for example, a yaw rate acting on the host vehicle, acceleration (longitudinal acceleration) acting in the longitudinal direction of the host vehicle, acceleration (lateral acceleration) acting in the lateral direction (vehicle-width direction) of the host vehicle, G (longitudinal G) acting in the longitudinal direction of the host vehicle, G (lateral G) acting in the lateral direction of the host vehicle, a cornering force, and the like.

In this case, the driving-assistance device according to the present invention further include determination means configured to determine that an unavoidable three-dimensional object is present in the travel range when an avoidance line which is a travel route of the host vehicle for which there is capability of avoiding a collision with the three-dimensional object is not present within the travel range. In this case, it can be reliably determined that the unavoidable three-dimensional object is present (that is, a collision between the host vehicle and the three-dimensional object cannot be avoided).

Here, some drivers tend to implement collision avoidance at a relatively late timing. As for such drivers, in a case where the driving assistance for collision avoidance is immediately started when it is determined that the unavoidable three-dimensional object is present in the travel range when an avoidance line is not present in the travel range, there may be a concern of causing these drivers to feel troubled.

Consequently, the driving-assistance device according to the present invention can further include assistance means configured to implement the driving assistance when a length of a travel route having a longest distance among travel routes of the host vehicle included in the travel range is equal to or less than a predetermined threshold, in a case where the determination means determines that the unavoidable three-dimensional object is present in the travel range. In this manner, even in a case where it is determined that the unavoidable three-dimensional object is present in the travel range, the implementation of the driving assistance for collision avoidance when the length of a travel route having a longest distance among travel routes is set to be equal to or less than a predetermined threshold enables the driving assistance for collision avoidance to be implemented without causing such drivers to feel troublesome.

Advantageous Effects of Invention

According to the present invention, it is possible to provide a driving-assistance device and a driving-assistance method which are capable of implementing driving assistance for collision avoidance more appropriate to a driver's intuition.

DESCRIPTION OF EMBODIMENTS

Figure 1:
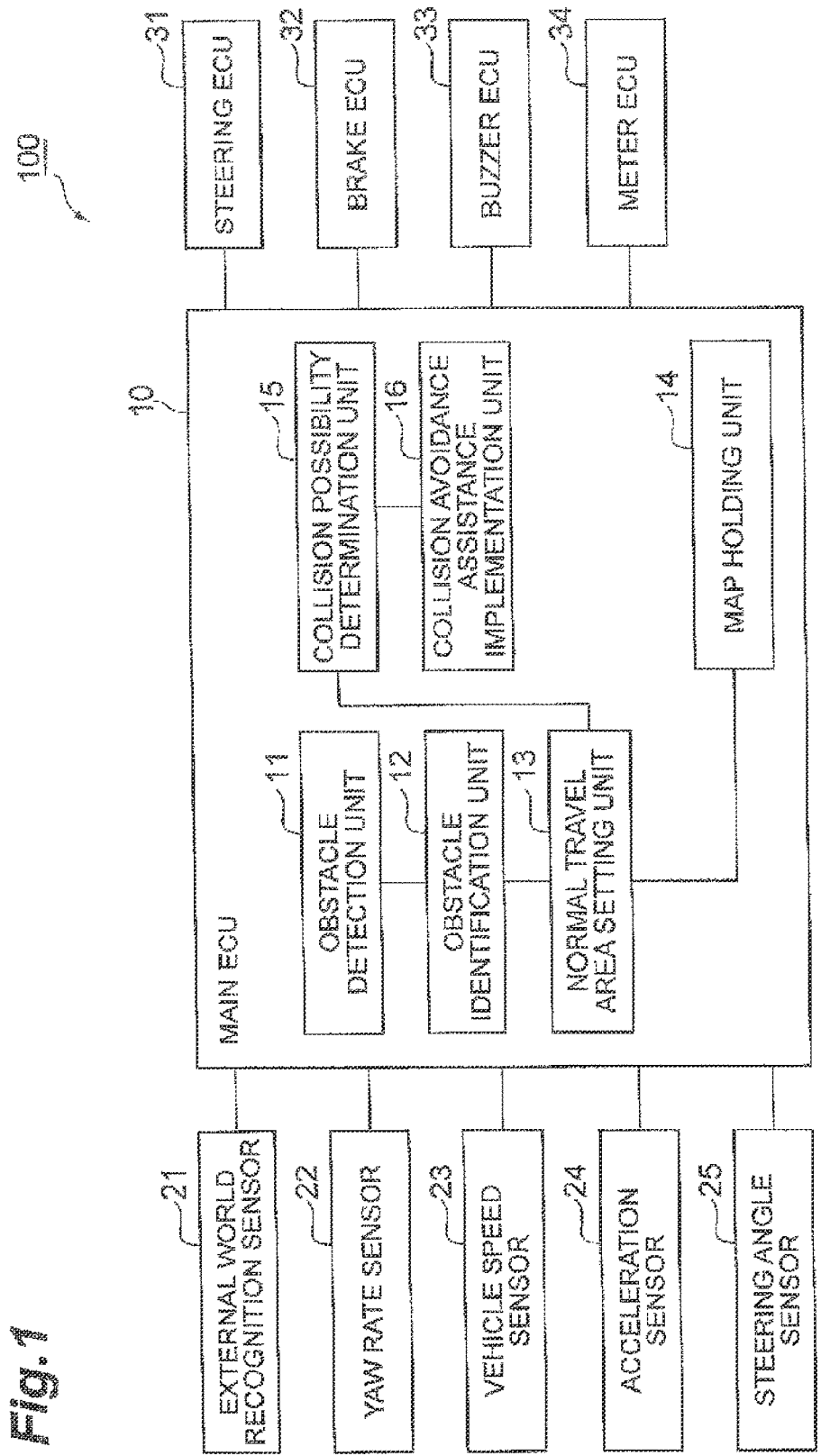
FIG. 1 is block diagram illustrating a configuration of a driving-assistance device according to an embodiment of the invention.

Hereinafter, an embodiment of a driving-assistance device and a driving-assistance method according to the present invention will be described in detail with reference to the accompanying drawings. Meanwhile, in the description of the drawings, the same components or equivalent components are denoted by the same reference numerals and signs, and thus the description thereof will not be repeated.

FIG. 1 is a block diagram illustrating a configuration of a driving-assistance device according to an embodiment of the invention. As shown in FIG. 1, a driving-assistance device 100 according to the present embodiment includes a main ECU (Electrical Control Unit) 10, various types of sensors 21 to 25 which are connected to the main ECU 10, and various types of ECUs 31 to 34 which are connected to the main ECU 10.

Hereinafter, a vehicle in which such a driving-assistance device 100 is mounted is called a "host vehicle". In addition, a three-dimensional object which is a target in assistance for collision avoidance with the host vehicle is called an "obstacle". The driving-assistance device 100 sets impossibility of collision avoidance between the host vehicle and the obstacle (three-dimensional object) within a predetermined range set in the vicinity of the host vehicle, as a condition for implementing driving assistance for collision avoidance that a collision between the host vehicle and the obstacle (three-dimensional object) cannot be avoided within a predetermined range which is set in the vicinity of the host vehicle. That is, when a three-dimensional object is present on a course of the host vehicle, the driving-assistance device 100 implements driving assistance for avoiding a collision between the host vehicle and the obstacle, on a condition that an unavoidable obstacle is present in a predetermined range including the course.

Meanwhile, "a collision cannot be avoided (or, an unavoidable obstacle is present)" herein means that a collision between a host vehicle and an obstacle cannot be avoided within a range of a driving operation which is capable of being normally performed by a driver of the host vehicle (or, such an obstacle is present), and does not indicate that a collision cannot be avoided even when driving assistance for collision avoidance using the driving-assistance device 100 is performed.

The external world recognition sensor 21 acquires information on an obstacle which is present in the vicinity of a host vehicle, information indicating a relative relation between the obstacle and the host vehicle, or the like. The information which is acquired by the external world recognition sensor 21 is, for example, image information of the obstacle, information indicating the speed of approach (relative movement speed) between the host vehicle and the obstacle, information indicating a relative position (for example, relative distance or relative angle) between the host vehicle and the obstacle, information indicating the absolute movement velocity of the obstacle, or the like.

Such an external world recognition sensor 21 can be constituted by at least one of measurement devices such as, for example, LIDAR (Laser Imaging Detection and Ranging), a laser range finder, a millimeter-wave radar, and a stereo camera.

The yaw rate sensor 22 acquires information indicating a yaw rate acting on the host vehicle. The vehicle speed sensor 23 acquires information indicating the speed of the host vehicle. The acceleration sensor 24 acquires information indicating acceleration (longitudinal acceleration) acting in the longitudinal direction of the host vehicle or acceleration (lateral acceleration) acting in the lateral direction (vehicle-width direction) of the host vehicle. The steering angle sensor 25 acquires information indicating the steering angle of the host vehicle.

The external world recognition sensor 21, the yaw rate sensor 22, the vehicle speed sensor 23, the acceleration sensor 24, and the steering angle sensor 25 output the acquired information, respectively, to the main ECU 10. Meanwhile, the driving-assistance device 100 can include any other sensors (not shown), as necessary, in addition to the various types of sensors 21 to 25 described above.

Other sensors to be illustrated which can be included in the driving-assistance device 100 include a brake sensor that acquires information indicating an operating torque (pedal force) of the brake pedal of the host vehicle, an accelerator sensor that acquires information indicating an operating torque (pedal force) of the accelerator pedal of the host vehicle, a steering torque sensor that acquires information indicating a steering torque of the host vehicle, and the like.

The steering ECU 31 controls electric power steering, for example, in order to assist the host vehicle with its steering torque in accordance with an instruction from the main ECU

10. The brake ECU 32 electrically adjusts the operating hydraulic pressure (brake hydraulic pressure) of an electronically controlled brake which is provided to each wheel, for example, in order to brake the host vehicle in accordance with an instruction from the main ECU 10.

The buzzer ECU 33 controls a buzzer, for example, so as to sound the buzzer of the host vehicle in accordance with an instruction from the main ECU 10. The meter ECU 34 controls display of a display unit, for example, so as to perform a predetermined display on the display unit for a meter of the host vehicle in accordance with an instruction from the main ECU 10.

Here, the main ECU 10 includes an obstacle detection unit 11, an obstacle identification unit 12, a normal travel area setting unit (setting means) 13, a map holding unit 14, a collision possibility determination unit (determination means) 15, and, a collision avoidance assistance implementation unit (assistance means) 16. Meanwhile, the main ECU 10 is mainly constituted by a computer including a CPU, a ROM, a RAM, and the like. The operation of each unit of the main ECU 10 is realized by executing a predetermined program on such a computer.

The obstacle detection unit 11 detects obstacles which are targets in collision avoidance assistance of the host vehicle, on the basis of information or the like which is input from the external world recognition sensor 21. Meanwhile, the obstacles (that is, three-dimensional objects which are targets in collision avoidance in the driving-assistance device 100) which are detected by the obstacle detection unit 11 are, for example, stationary objects such as a telephone pole, a tree, a guardrail and the like, and moving objects such as a pedestrian, a two-wheeled vehicle such as a bicycle, and a vehicle such as a preceding vehicle or an oncoming vehicle, and the like.

The obstacle identification unit 12 identifies the obstacle which is detected by the obstacle detection unit 11. Thereby, it is identified whether the obstacle which is detected by the obstacle detection unit 11 corresponds to, for example, any of the above ones. Meanwhile, the identification of the obstacle can be performed by, for example, any methods such as pattern matching based on image recognition or a combination method of white line information.

The normal travel area setting unit 13 sets a normal travel area (predetermined range) of a driver in the vicinity of the host vehicle. The setting of the normal travel area of the normal travel area setting unit 13 will be described in detail with reference to FIG. 2. The normal travel area setting unit 13 first acquires a current lateral acceleration (momentum) $Gy$ of a host vehicle C on the basis of information which is input from the acceleration sensor 24. Subsequently, the normal travel area setting unit 13 specifies a route (course) A through which the host vehicle C is expected to pass when the host vehicle travels with the current lateral acceleration $Gy$ being maintained.

Subsequently, when the normal amount of variation (amount of variation in momentum) $\Delta Gy$ is added to the current lateral acceleration $Gy$ of the host vehicle C, the normal travel area setting unit 13 specifies a route (course) B1 through which the host vehicle C is expected to pass. Concurrently with this, when the normal amount of variation $\Delta Gy$ is subtracted from the current lateral acceleration $Gy$ of the host vehicle C, the normal travel area setting unit 13 specifies a route (course) B2 through which the host vehicle C is expected to pass. Meanwhile, the normal amount of variation $\Delta Gy$ is, for example, an amount equivalent to the maximum amount of variation of lateral acceleration within a range of a driving operation which can be normally performed by a driver, and an amount which is experimentally obtained in advance.

The routes B1 and B2 can be specified from, for example, the turning radius R of the host vehicle C which is calculated from a value obtained by subtracting or adding the normal amount of variation $\Delta Gy$ from or to the current lateral acceleration $Gy$. Meanwhile, the turning radius R can be obtained by dividing a vehicle speed V by a yaw rate $\gamma$ ($R=V/\gamma$). In addition, the yaw rate $\gamma$ can be obtained by dividing the lateral acceleration $Gy$ by the vehicle speed V ($\gamma=Gy/V$).

Figure 3:
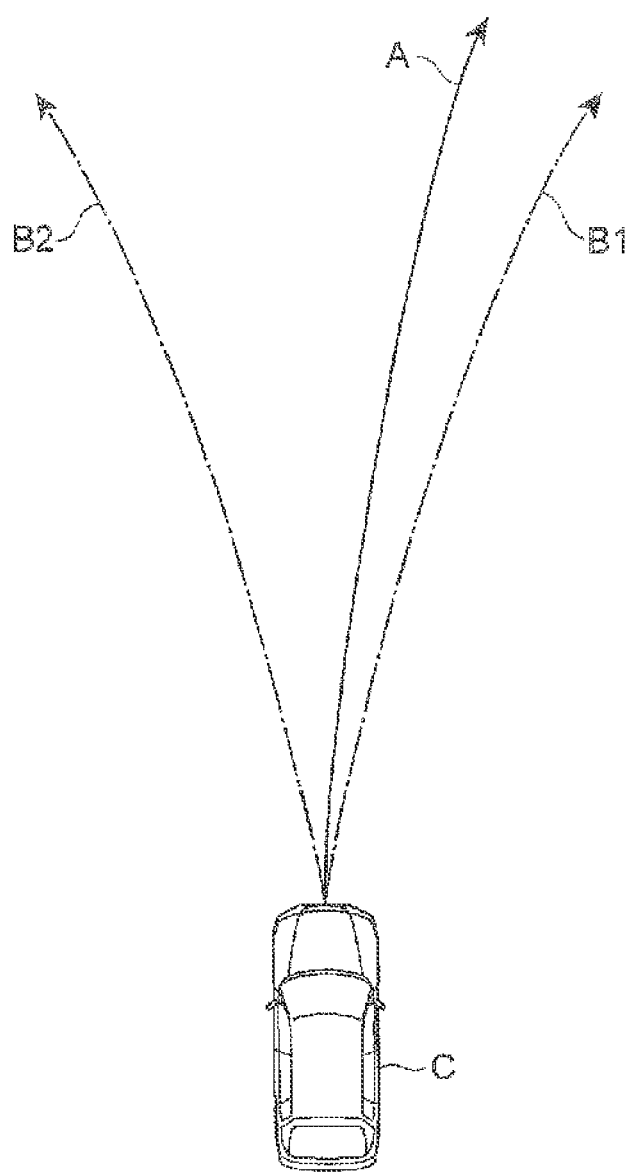
FIG. 3 is a diagram illustrating a modification example of an operation of the normal travel area setting unit shown in FIG. 1.

Meanwhile, as shown in FIG. 3, when the host vehicle C is already in a turning state at this moment in time ($|Gy|>0$), there is a possibility that the absolute value ($|Gy\pm\Delta Gy|$) of a value obtained by increasing or decreasing the current lateral acceleration $Gy$ by the normal amount of variation $\Delta Gy$ may become larger than a maximum lateral acceleration (for example, 0.2 G to 0.3 G) which can be generated by a normal driving operation of a driver. Thus, the magnitude of the normal amount of variation $\Delta Gy$ may be restricted so that the absolute value of the value obtained by increasing or decreasing the current lateral acceleration $Gy$ by the normal amount of variation $\Delta Gy$ becomes equal to or less than the maximum lateral acceleration.

Figure 2:
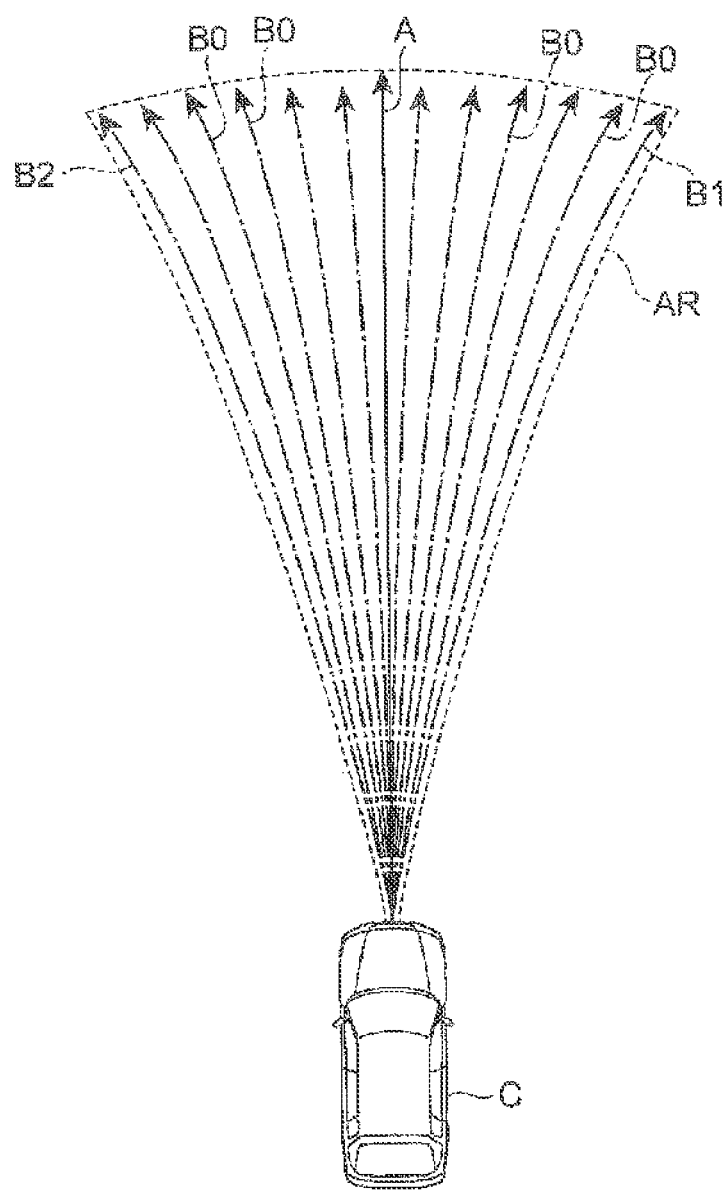
FIG. 2 is a diagram illustrating a situation in which a normal travel area setting unit shown in FIG. 1 sets a normal travel area.

Subsequently, as shown in FIG. 2, the normal travel area setting unit 13 specifies a plurality of routes (courses) B0 through which the host vehicle C is expected to pass when the steering angle or the lateral acceleration of the host vehicle C is changed by increments in an area from the route B1 to the route B2.

The normal travel area setting unit 13 sets a substantially fan-shaped area which is specified by the plurality of routes (particularly, routes B1 and B2), as a normal travel area AR. That is, the normal travel area setting unit 13 sets a travel range of the host vehicle C which is specified by a plurality of travel routes along which the host vehicle C is capable of traveling when the current lateral acceleration $Gy$ of the host vehicle C is increased or decreased by the normal amount of variation $\Delta Gy$, as the normal travel area AR.

Meanwhile, the normal travel area setting unit 13 changes the routes B1 and B2 by changing the normal amount of variation $\Delta Gy$ on the basis of information indicating identification results of the obstacle identification unit 12, information of the host vehicle C which is input from various types of sensors, or the like, and thereby sets (changes) the degree of width of the normal travel area AR, but the method thereof will be described later.

Figure 4:
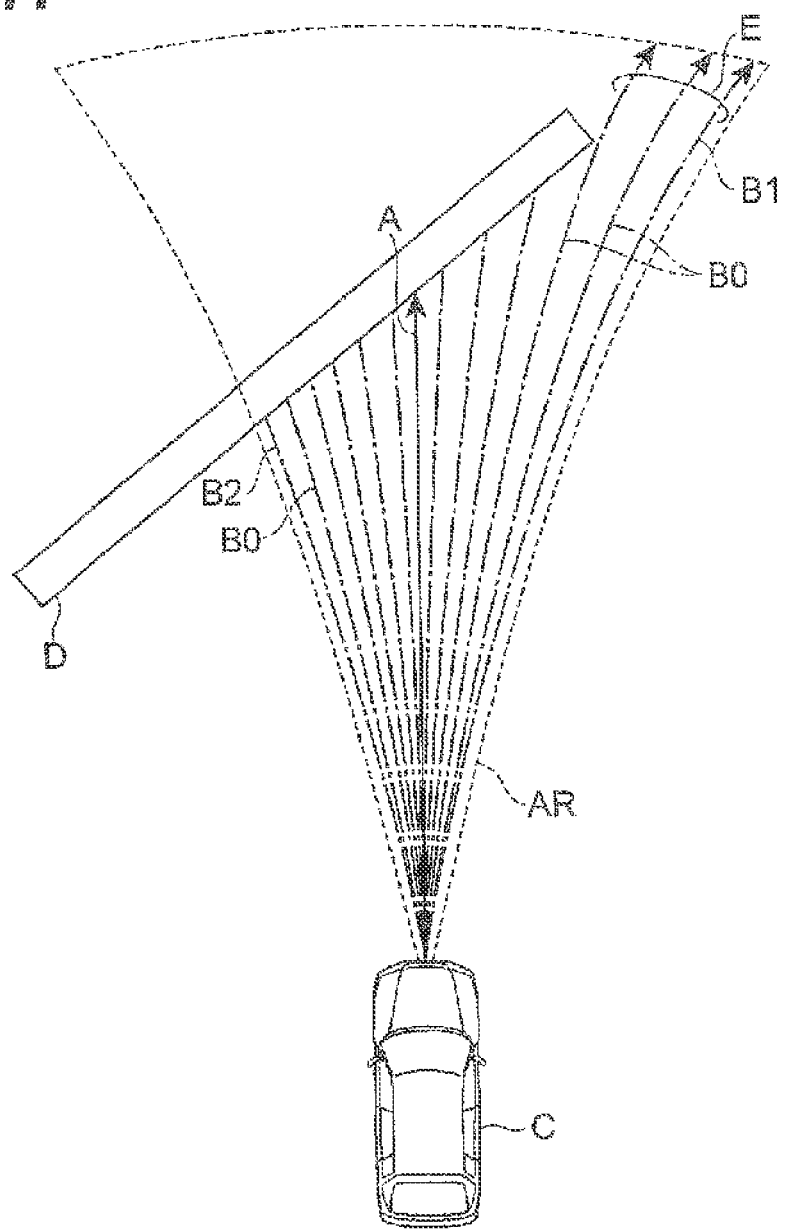
FIG. 4 is a diagram illustrating a situation in which a collision possibility determination unit shown in FIG. 1 determines collision possibility.

The collision possibility determination unit 15 determines whether there is the possibility of a collision between the obstacle and the host vehicle C within the normal travel area AR which is set by the normal travel area setting unit 13. That is, the collision possibility determination unit 15 determines whether an obstacle having the possibility of collision with the host vehicle C is present within the normal travel area AR which is set by the normal travel area setting unit 13. More specifically, as shown in FIG. 4, when an avoidance line E which is a travel route of the host vehicle C for which there is capability of avoiding a collision between the host vehicle C and an obstacle D is present within the normal travel area AR which is set by the normal travel area setting unit 13, the collision possibility determination unit 15 determines that a collision between the host vehicle C and the obstacle D can be avoided (that is, determines that the unavoidable obstacle D is not present within the normal travel area AR).

Figure 5:
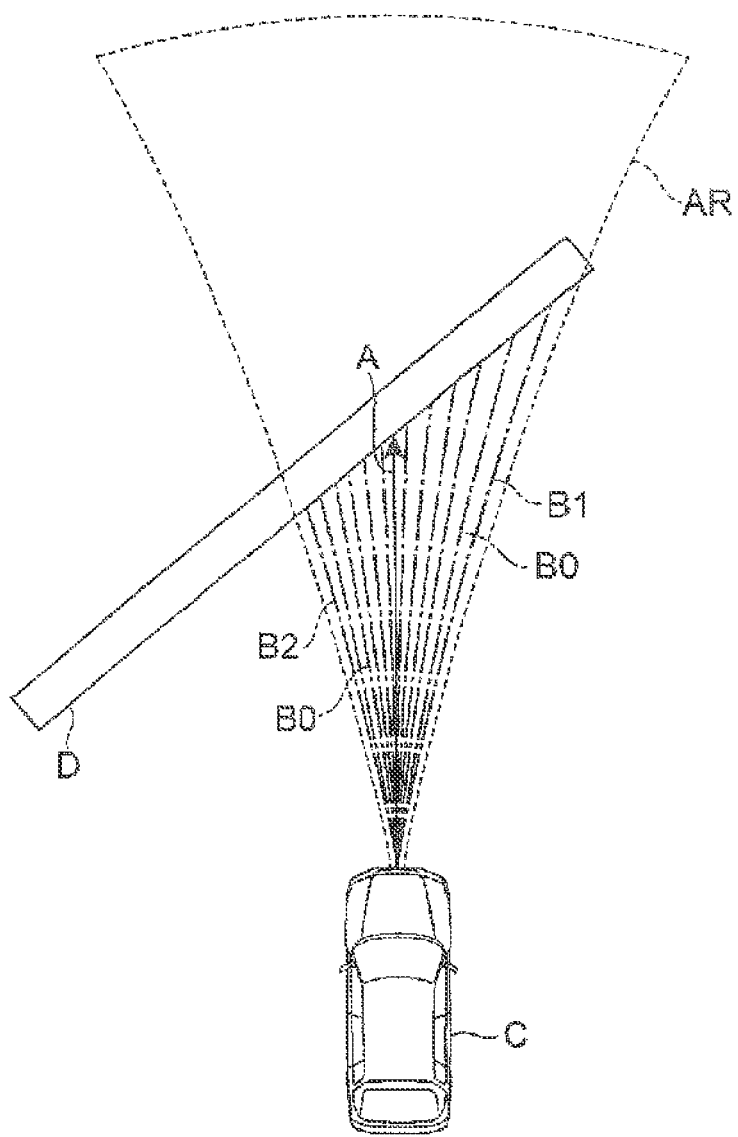
FIG. 5 is a diagram illustrating a situation in which the collision possibility determination unit shown in FIG. 1 determines collision possibility.

On the other hand, as shown in FIG. 5, for example, due to a relative positional relationship between the host vehicle C and the obstacle D changing, when an avoidance line is not present within the normal travel area AR (that is, when the obstacle D interferes with all the routes which are specified by the normal travel area setting unit 13), the collision possibility determination unit 15 determines that a collision between the host vehicle C and the obstacle D cannot be avoided within the normal travel area AR (that is, determines that the unavoidable obstacle D is present).

When it is determined by the collision possibility determination unit 15 that a collision between the host vehicle C and the obstacle D cannot be avoided (that is, when the unavoidable obstacle D is determined to be present), the collision avoidance assistance implementation unit 16 implements driving assistance for collision avoidance of the host vehicle C. In the collision avoidance assistance implementation unit 16, it is possible to determine a timing at which driving assistance for collision avoidance is implemented, for example, as follows. That is, the collision avoidance assistance implementation unit 16 can implement the driving assistance for collision avoidance when the length of a route having a longest distance between the host vehicle C and the obstacle D among the routes (for example, route B1 or B0, and the like) included in the normal travel area AR is set to be equal to or less than a predetermined threshold.

Alternatively, the collision avoidance assistance implementation unit 16 may calculate a time which will be taken until the host vehicle C arrives at the obstacle D with respect to the route having a longest distance between the host vehicle C and the obstacle D among the routes included in the normal travel area AR, and may perform driving assistance for collision avoidance when the time taken until arrival is set to be equal to or less than a predetermined threshold. The predetermined threshold relevant to the length of the route or the time taken until arrival can be changed in accordance with the state of the host vehicle C. More specifically, for example, when the vehicle speed of the host vehicle C is high, the predetermined threshold can be set to be higher than when the vehicle speed thereof is low. In addition, for example, when the yaw rate of the host vehicle C is high, the predetermined threshold may be set to be higher than when the vehicle speed thereof is low.

The driving assistance for collision avoidance which is implemented by the collision avoidance assistance implementation unit 16 can be assumed to provide control of the behavior of the host vehicle C such as, for example, control of electric power steering through the steering ECU 31 or control of an electronically controlled brake through the brake ECU 32. In this case, the collision avoidance assistance implementation unit 16 can calculate, for example, a target yaw rate required for avoiding a collision between the host vehicle C and the obstacle D, and can determine the control amount (steering torque) of electric power steering through the steering ECU 31 and the control amount (brake hydraulic pressure) of an electronically controlled brake through the brake ECU 32 so that the actual yaw rate of the host vehicle C is coincident with a target yaw rate.

A relationship between the target yaw rate and the steering torque and a relationship between the target yaw rate and the brake hydraulic pressure may be held in a state of being mapped in advance. In addition, a method of slowing down the host vehicle C is not limited to a method of actuating a friction brake through the control of an electronically controlled brake, and may be implemented using a method of converting (regenerating) kinetic energy of the host vehicle C into electrical energy or a method of increasing an engine brake by changing the transmission gear ratio of a transmission. In addition, a method of changing the yaw rate of the host vehicle C is not limited to a method of changing a steering angle through electric power steering, and may be implemented using a method of applying brake hydraulic pressures different from each other to the right and left wheels of the host vehicle C.

Further, the driving assistance for collision avoidance which is implemented by the collision avoidance assistance implementation unit 16 may be to provide the giving of a warning to a driver of the host vehicle C such as, for example, the sounding of a buzzer through the buzzer ECU 33 or the displaying of a message on a display unit through the meter ECU 34.

In this manner, this driving-assistance device 100 makes it a condition for implementing collision avoidance assistance that the normal travel area AR including the course of the host vehicle C is set in the vicinity of the host vehicle C, and that a collision between the host vehicle C and the obstacle D cannot be avoided within the normal travel area AR. That is, the driving-assistance device 100 implements driving assistance for avoiding a collision between the host vehicle C and the obstacle D, on a condition that the unavoidable obstacle D is present in the normal travel area AR. Therefore, according to the driving-assistance device 100, it is possible to prevent a driver of the host vehicle C from feeling troubled, and to implement the driving assistance for collision avoidance appropriate to a driver's intuition.

Here, according to the knowledge of the inventor, a sense of danger of a collision with the obstacle D which is felt by a driver of the host vehicle C may vary with the state (for example, moving state or type) of the obstacle D. For this reason, in the driving-assistance device 100 according to the present embodiment, the timing at which the condition for implementing the driving assistance for collision avoidance is established (in other words, timing at which the driving assistance for collision avoidance is implemented) becomes variable in accordance with the state of the obstacle D.

Figure 6:
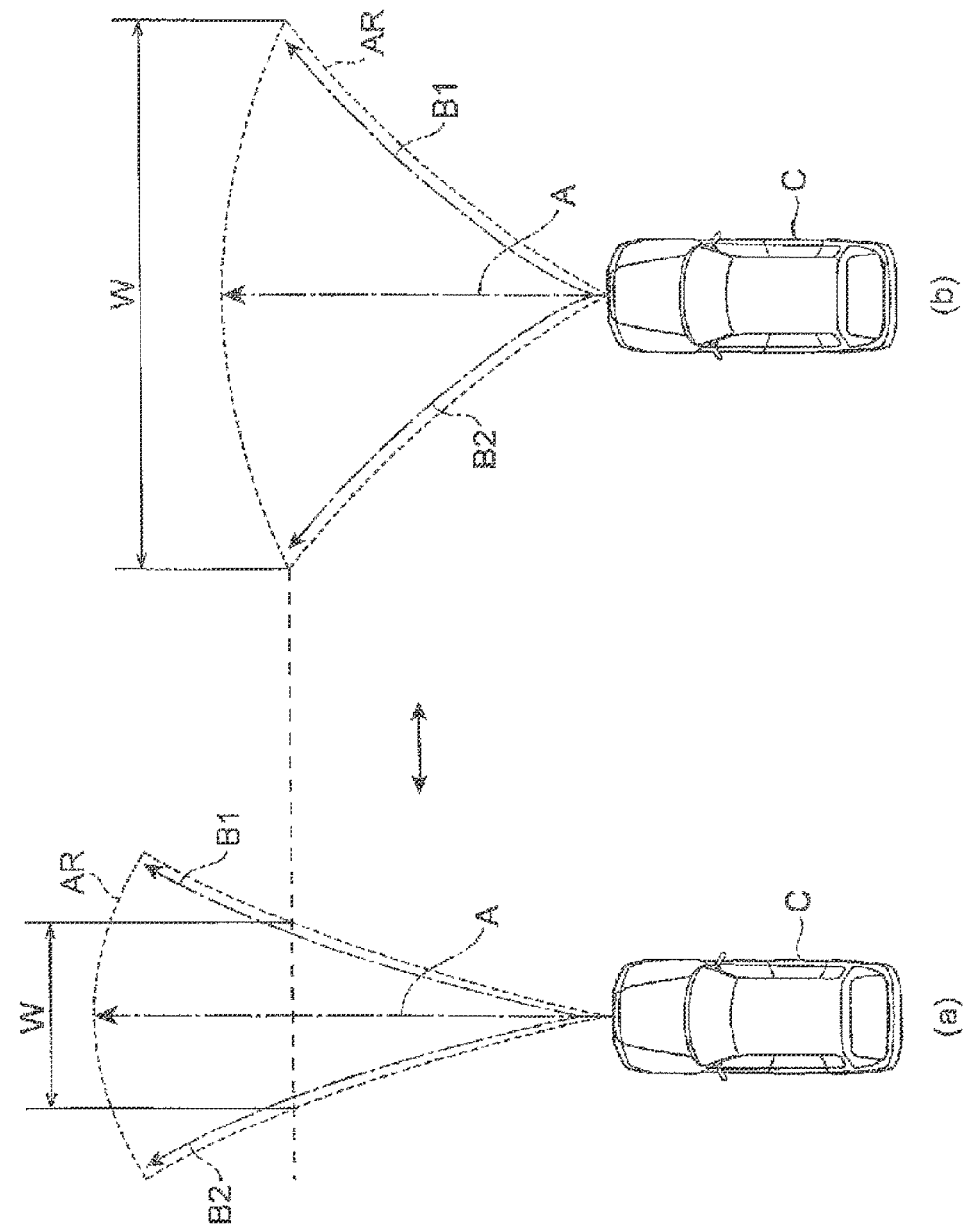
FIG. 6 is a diagram illustrating a situation in which the normal travel area setting unit shown in FIG. 1 sets the degree of width of the normal travel area.

That is, the normal travel area setting unit 13 sets (changes) the degree of width W of the normal travel area AR in the vehicle-width direction of the host vehicle C, as shown in FIG. 6, in accordance with a predetermined rule which is set in advance on the basis of at least one of the moving state and the type of the obstacle D. When a sense of danger felt by a driver with respect to the obstacle D is relatively large, as shown in (a) of FIG. 6, the normal travel area setting unit 13 relatively reduces the degree of width W of the normal travel area AR, and advances a timing at which a condition for implementing the driving assistance for collision avoidance is established.

On the other hand, when a sense of danger felt by a driver with respect to the obstacle D is relatively small, as shown in (b) of FIG. 6, the normal travel area setting unit 13 relatively increases the degree of width W of the normal travel area AR, and retards a timing at which a condition for implementing driving assistance for collision avoidance is established.

The setting of the degree of width W of the normal travel area AR performed by such a normal travel area setting unit 13 will be described in more detail. At the time of setting the normal travel area AR, the normal travel area setting unit 13 initially refers to identification results of the obstacle D from the obstacle identification unit 12 and a map which is held by the map holding unit 14, and sets the normal amount of variation $\Delta Gy$ depending on the state of the obstacle D.

Figure 7:
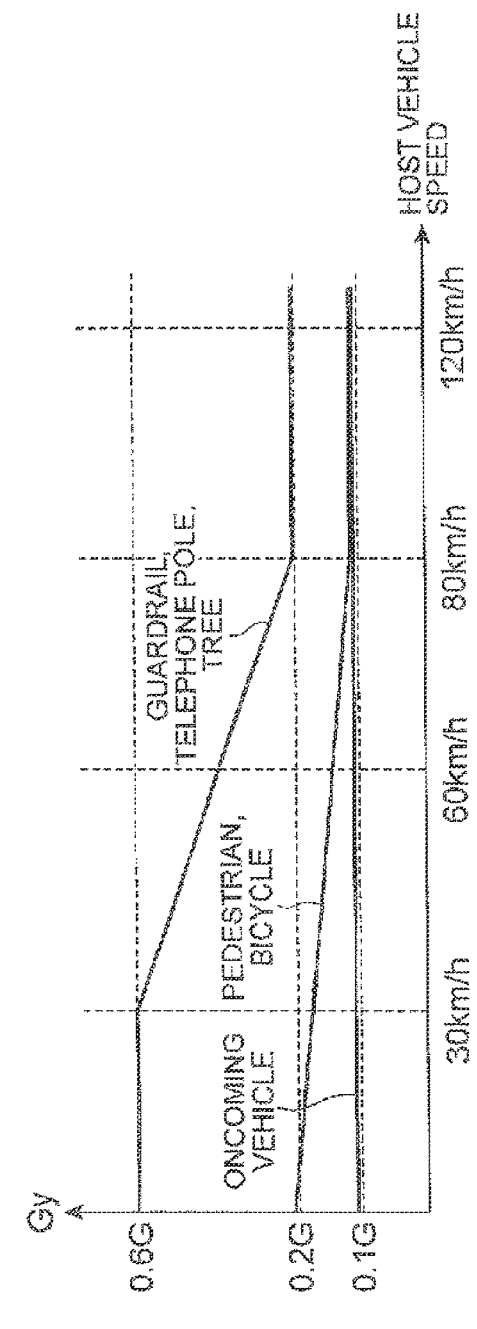
FIG. 7 is a diagram illustrating a map which is held by a map holding unit shown in FIG. 1.

As shown in (a) of FIG. 7, the normal amount of variation ΔGy is associated with a map M which is held by the map holding unit 14, for example, for each type (including the moving state) of the obstacle D. Therefore, when the normal travel area setting unit 13 refers to the map M which is held by the map holding unit 14 on the basis of the identification results of the obstacle D from the obstacle identification unit 12, the normal amount of variation ΔGy can be determined.

For example, when the identification results of the obstacle D from the obstacle identification unit 12 are results indicating that the type of the obstacle D is a guardrail and the like, the normal travel area setting unit 13 sets the normal amount of variation ΔGy to 0.6 G. The normal travel area AR is specified by the routes B1 and B2 and the like which are generated by the normal amount of variation ΔGy determined in this manner, the normal travel area AR of the degree of width W depending on the state of the obstacle D is set as a result.

As shown in FIG. 7, in the present embodiment, the normal travel area setting unit 13 sets the normal amount of variation ΔGy to become relatively smaller and sets the degree of width of the normal travel area AR in the vehicle-width direction of the host vehicle C to become relatively smaller, in a case where the obstacle D is a moving object such as a pedestrian, a bicycle or an oncoming vehicle than in a case where the obstacle D is a stationary object such as a guardrail, a telephone pole or a tree. This is because a sense of danger felt by a driver is larger in a case where the obstacle D is a moving object than in a case where the obstacle is a stationary object, and it is considered to be preferable to implement the driving assistance for collision avoidance at a relatively early timing.

In addition, in the present embodiment, the normal travel area setting unit 13 sets the normal amount of variation ΔGy to become smaller and sets the degree of width of the normal travel area AR in the vehicle-width direction of the host vehicle C to become smaller, as the absolute movement velocity of the obstacle D becomes higher. Specifically, the normal travel area setting unit 13 sets the normal amount of variation ΔGy to become smaller and sets the degree of width of the normal travel area AR to become smaller, in a case where the obstacle D is a pedestrian or a bicycle which moves at a relatively low absolute movement velocity than in a case where the obstacle is a guardrail or a telephone pole which remains stationary.

In addition, the normal travel area setting unit 13 sets the normal amount of variation ΔGy to become smaller and sets the degree of width of the normal travel area AR to become smaller, in a case where the obstacle D is an oncoming vehicle which moves at a relatively high absolute movement velocity than in a case where the obstacle is a pedestrian or a bicycle which moves at a relatively low absolute movement velocity. This is because a sense of danger felt by a driver becomes larger as the absolute movement velocity of the obstacle D becomes higher, and it is considered to be preferable to implement the driving assistance for collision avoidance at a relatively early timing.

In addition, in the present embodiment, the normal travel area setting unit 13 sets the normal amount of variation ΔGy to become smaller and sets the degree of width of the normal travel area AR to become smaller, in a case where the obstacle D is a vehicle (here, oncoming vehicle) than in a case where the obstacle D is a person (here, pedestrian) or a two-wheeled vehicle (here, bicycle). This is because a sense of danger felt by a driver becomes larger in a case where the obstacle D is a vehicle than in a case where the obstacle is a person or a two-wheeled vehicle, and it is considered to be preferable to implement the driving assistance for collision avoidance at a relatively early timing.

Further, in the present embodiment, the normal travel area setting unit 13 can set the normal amount of variation ΔGy to become smaller and can set the degree of width W of the normal travel area AR to become smaller, as the speed of approach between the host vehicle C and the obstacle D becomes higher. This is because a sense of danger felt by a driver becomes larger as the speed of approach between the host vehicle C and the obstacle D becomes higher, and it is considered to be preferable to implement the driving assistance for collision avoidance at an earlier timing.

Meanwhile, in the present embodiment, when focusing on the type (except an oncoming vehicle) of any one obstacle D, the normal travel area setting unit 13 reduces the normal amount of variation ΔGy as the vehicle speed (host vehicle speed) V of the host vehicle C becomes higher. For that reason, values of the inclination of graphs (see (b) of FIG. 7) indicating a change in the normal amount of variation ΔGy with respect to the host vehicle speed V are set in the map M which is held by the map holding unit 14, for each type of the obstacles D.

For example, when the obstacle D is a guardrail or the like, the normal amount of variation ΔGy is 0.6 G in a case where the host vehicle speed V is less than 30 km/h, but is reduced to an inclination of −0.008 in a case where the host vehicle speed V is between 30 km/h and 80 km/h, and is equal to 0.2 G in a case where the host vehicle speed V is higher than 80 km/h. When the obstacle D is a pedestrian or a bicycle, similarly, the normal amount of variation ΔGy becomes smaller as the host vehicle speed V becomes higher.

This is because, since a driver feels more risk as the host vehicle speed becomes higher, it is considered to be preferable to implement the driving assistance for collision avoidance at an earlier timing. However, when the obstacle D is a pedestrian or a bicycle, the dependency of the normal amount of variation ΔGy on the host vehicle speed V becomes relatively smaller than when the obstacle D is a guardrail or the like. When the obstacle D is an oncoming vehicle, the normal amount of variation ΔGy is constant without depending on the host vehicle speed V.

This is because, in a case of the obstacle D, such as a pedestrian, a bicycle or an oncoming vehicle, in which a sense of danger of a driver is expected to become larger, it is considered to be preferable to implement the driving assistance for collision avoidance at an earlier timing without depending on the host vehicle speed V.

Figure 8:
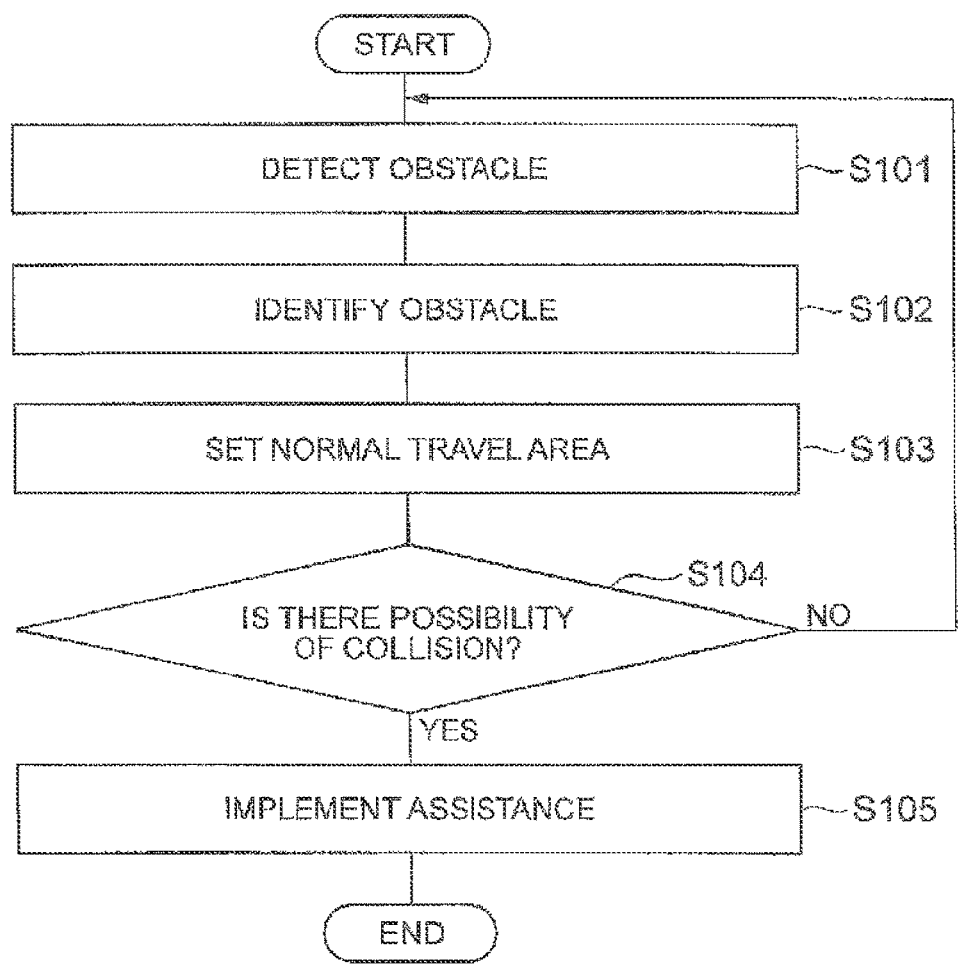
FIG. 8 is a flow diagram of a driving-assistance method which is implemented by the driving-assistance device shown in FIG. 1.

Subsequently, a driving-assistance method in the driving-assistance device 100 will be described with reference to FIG. 8. As shown in FIG. 8, in the driving-assistance device 100, first, the obstacle detection unit 11 detects the obstacles D which are present in the vicinity of the host vehicle C on the basis of information from the external world recognition sensor 21 (step S101).

Subsequently, the obstacle identification unit 12 identifies the obstacles D which are detected by the obstacle detection unit 11 (step S102). By the identification of the obstacle identification unit 12, it is identified whether the obstacles D are, for example, stationary objects such as a telephone pole, a tree, and a guardrail, or moving objects such as a pedestrian, a two-wheeled vehicle such as a bicycle, and a vehicle such as a preceding vehicle or an oncoming vehicle.

Subsequently, the normal travel area setting unit 13 sets the normal travel area AR in the vicinity of the host vehicle C as described above (step S103: setting step). In this case, the normal travel area setting unit 13 sets the degree of width W of the normal travel area AR, as described above, in accordance with a rule (for example, rule shown in the map M of FIG. 7) which is set in advance on the basis of at least one of the moving state and the type of the obstacle D.

Subsequently, the collision possibility determination unit 15 determines whether there is the possibility of a collision between the host vehicle C and the obstacle D within the normal travel area AR (step S104). In other words, the collision possibility determination unit 15 determines whether a collision between the host vehicle C and the obstacle D can be avoided within the normal travel area AR (in other words, determines whether an unavoidable obstacle D is present within the normal travel area AR). This can be determined depending on whether the avoidance line E is present within the normal travel area AR as described above.

As a result of the determination, when there is the possibility of a collision between the host vehicle C and the obstacle D within the normal travel area AR (that is, when a collision between the host vehicle C and the obstacle D cannot be avoided within the normal travel area AR (in other words, when an unavoidable obstacle D is present within the normal travel area AR)), the collision avoidance assistance implementation unit 16 implements driving assistance for collision avoidance of the host vehicle C through various types of ECUs 31 to 34 (step S105).

Meanwhile, the result of the determination in step S104 is that there is no possibility of the host vehicle C and the obstacle colliding with each other within the normal travel area AR (that is, when a collision between the host vehicle C and the obstacle D can be avoided within the normal travel area AR (in other words, when an unavoidable obstacle D is not present within the normal travel area AR)), the process of the driving-assistance device 100 returns to step S101. The driving-assistance device 100 repeatedly implements the above driving-assistance method at predetermined time intervals.

As described above, in the driving-assistance device 100 and the driving-assistance method according to the present embodiment, the degree of width W of the normal travel area AR is set in accordance with a rule based on the moving state or the type of the obstacle D. For this reason, the timing at which a collision between the host vehicle C and the obstacle D cannot be avoided within the normal travel area AR (that is, timing at which the condition for implementing the driving assistance for collision avoidance is established) becomes variable in accordance with the moving state or the type of the obstacle D. Thus, according to the driving-assistance device 100, it is possible to implement the driving assistance for collision avoidance more appropriate to a driver's intuition.

Figure 9:
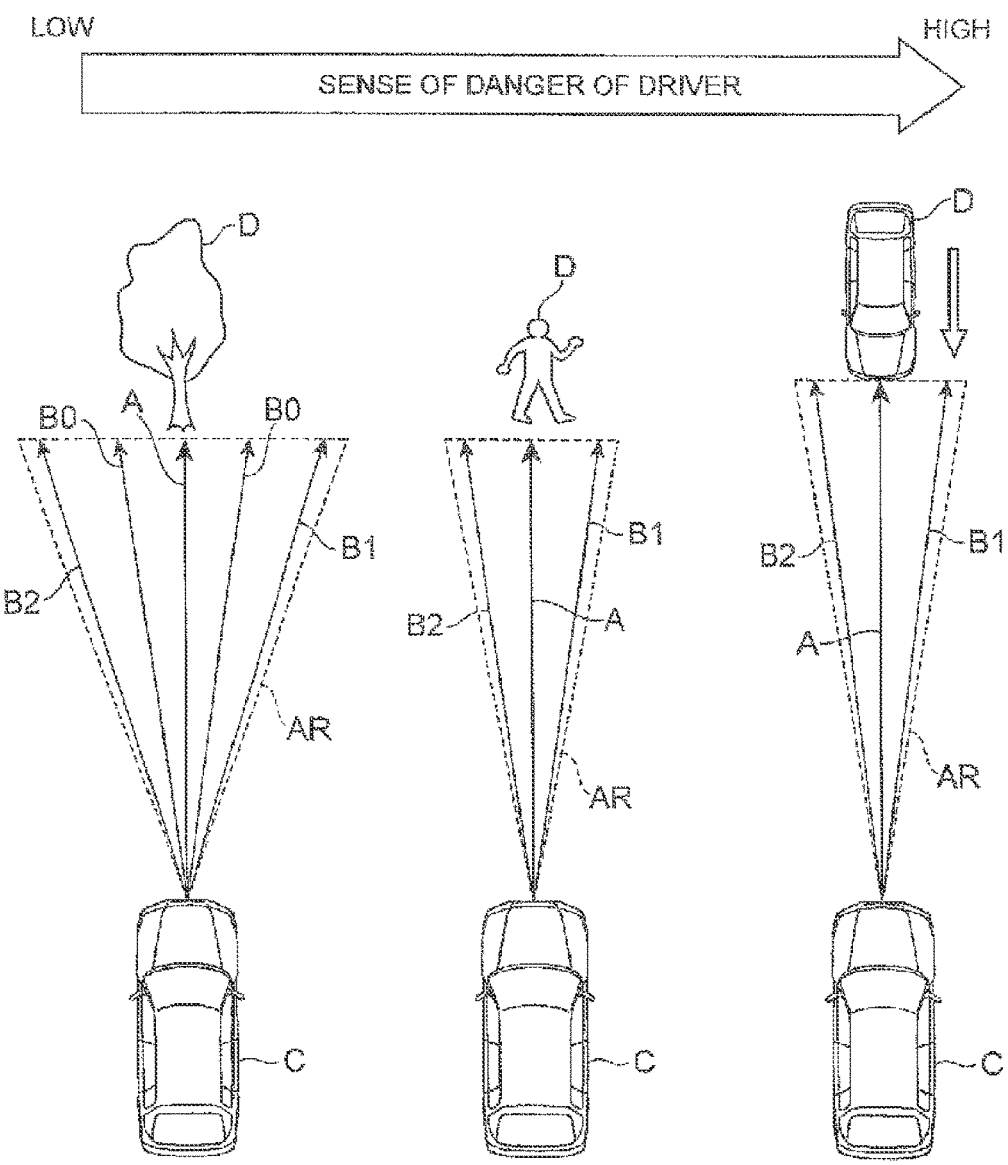
FIG. 9 is a diagram illustrating a situation in which the normal travel area setting unit shown in FIG. 1 sets the degree of width of the normal travel area.

Particularly, in the driving-assistance device 100, as shown in FIG. 9, the degree of width W of the normal travel area AR is set to become smaller (that is, the normal travel area AR is reduced) as a sense of danger felt by a driver with respect to the type of the obstacle D becomes higher. Therefore, it is possible to implement the driving assistance for collision avoidance still more appropriate to a driver's intuition.

The above embodiment is a description of an embodiment of the driving-assistance device and the driving-assistance method according to the present invention. Therefore, the driving-assistance device and the driving-assistance method according to the present invention are not limited to the above description. The driving-assistance device and the driving-assistance method as described according to the present invention can be arbitrarily changed and modified without departing from the scope of the appended claims.

Figure 10:
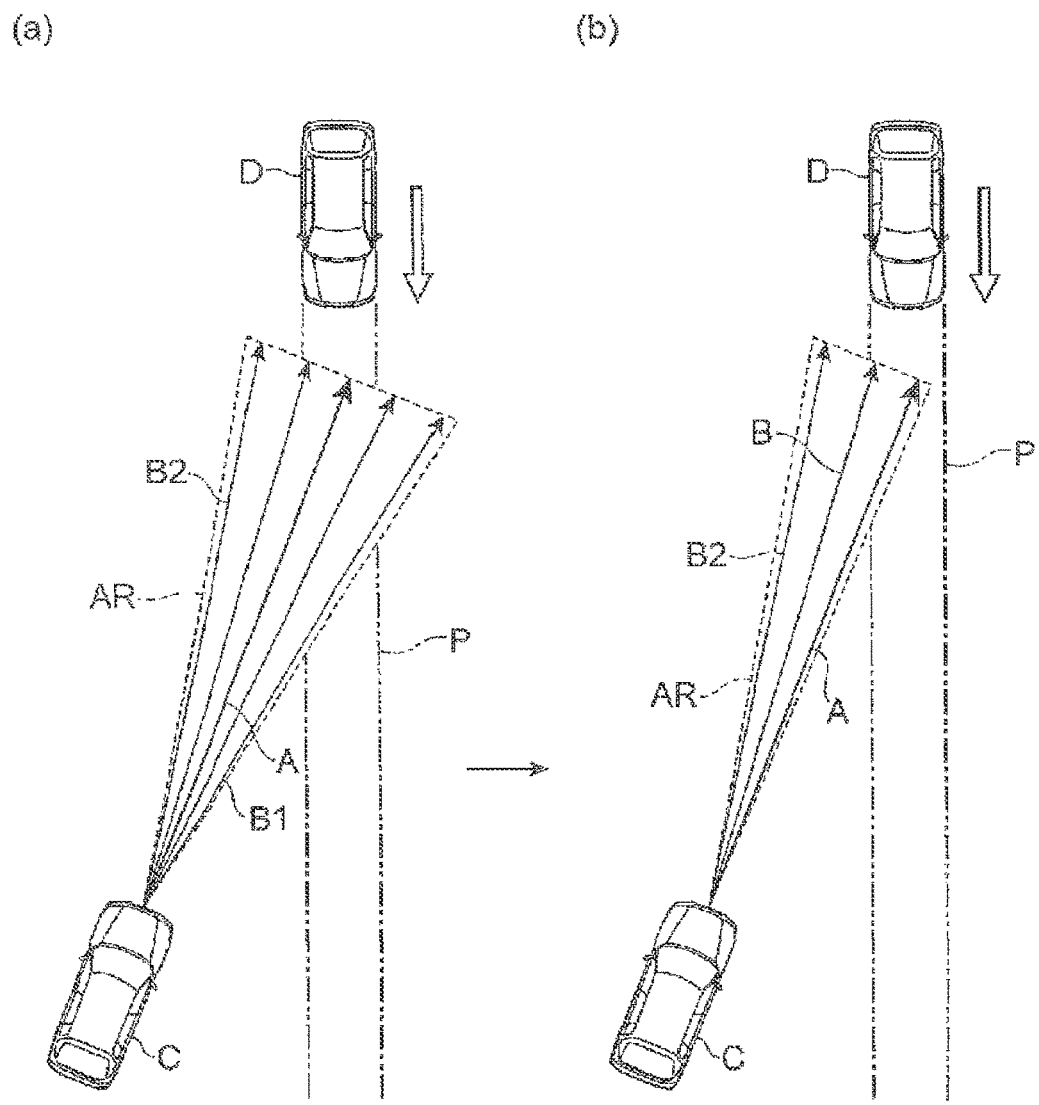
FIG. 10 is a diagram illustrating a modification example of the operation of the normal travel area setting unit shown in FIG. 1.

For example, as shown in (a) of FIG. 10, when the result of prediction of a future course P of the oncoming vehicle D which is an obstacle is that there is the possibility of a collision between the host vehicle C and the oncoming vehicle D, it is not likely to be considered that the host vehicle is avoided toward the course P of the oncoming vehicle D, with respect to a route A through which the host vehicle C is expected to pass when the host vehicle travels with the current lateral acceleration Gy of the host vehicle C being maintained. Therefore, in such a case, as shown in (b) of FIG. 10, the normal travel area setting unit 13 eliminates (reduces) a portion of the course P side of the oncoming vehicle D rather than the route A of the host vehicle C in the normal travel area AR, and thus the degree of width W of the normal travel area AR may be reduced.

In addition, the normal travel area (predetermined range) AR can be set from, for example, a range which can be detected by the external world recognition sensor 21 in the vicinity of the host vehicle, but is not limited to a case where the entire area is included in a range which can be detected by the external world recognition sensor 21, and may be smaller than the range which can be detected by the external world recognition sensor 21. For example, the normal travel area AR may be the same as the range which can be detected by the external world recognition sensor 21.

In addition, the obstacle detection unit 11 is not limited to a configuration in which detection based on point measurement in the lines (for example, routes A, B0, B1, and B2) is performed. For example, the obstacle detection unit 11 may perform control on the basis of a range in which the obstacles D continuously extend in a vehicle-width direction, within a range which is set in a captured image of the external world recognition sensor 21.

Further, the normal travel area setting unit 13 may set the degree of width W of the normal travel area AR in accordance with a predetermined rule which is set in advance on the basis of the moving state of the obstacle D, and may set the degree of width W of the normal travel area AR in accordance with a predetermined rule which is set in advance on the basis of both the moving state and the type of the obstacle D.

INDUSTRIAL APPLICABILITY

According to the invention, it is possible to provide a driving-assistance device and a driving-assistance method which are capable of implementing driving assistance for collision avoidance more appropriate to a driver's intuition.

REFERENCE SIGNS LIST

13: normal travel area setting unit (setting means), 15: collision possibility determination unit (determination means), 16: collision avoidance assistance implementation unit (assistance means), 100: collision avoidance assistance device, C: host vehicle, AR: normal travel area (predetermined range), D: obstacle (three-dimensional object), W: degree of width, E: avoidance line

The invention claimed is:

1. A driving-assistance device configured to, when a three-dimensional object is present on a forward course of a host vehicle, implement driving assistance for avoiding a collision between the host vehicle and the three-dimensional object on a condition that an unavoidable three-dimensional object is present in a normal travel area of the host vehicle wherein the normal travel area includes the forward course, the driving-assistance device comprising:

an electronic control unit, wherein the electronic control unit is configured to set the normal travel area specified by a plurality of forward courses along which the host vehicle is capable of traveling, in the vicinity of the host vehicle, wherein the electronic control unit is configured to determine that the unavoidable three-dimensional object is present in the normal travel area when an avoidance line which is a travel route of the host vehicle for which there is capability of avoiding a collision with the three-dimensional object is not present within the normal travel area, wherein the electronic control unit is configured to change the normal travel area based on information regarding lateral acceleration of the host vehicle, the normal travel area expanding along a vehicle-width direction as a forward movement of the host vehicle, wherein the electronic control unit is configured to adjust a degree of width of the normal travel area in accordance with a predetermined rule which is set in advance on the basis of at least one of a moving state and a type of the three-dimensional object, wherein the driving-assistance device is configured to implement the driving assistance based on a variable timing, and wherein the electronic control unit sets the degree of width to become smaller as a speed of approach between the host vehicle and the three-dimensional object becomes higher so as to decrease a timing of the variable timing of when the driving assistance is implemented.

2. The driving-assistance device according to claim 1, wherein the electronic control unit sets the degree of width to be relatively smaller in a case where the three-dimensional object is a moving object than in a case where the three-dimensional object is a stationary object.

3. The driving-assistance device according to claim 1, wherein the electronic control unit sets the degree of width to be relatively smaller in a case where the three-dimensional object is a vehicle than in a case where the three-dimensional object is a person or a two-wheeled vehicle.

4. The driving-assistance device according to claim 1, wherein the electronic control unit sets the degree of width to be relatively smaller in a case where the three-dimensional object is an oncoming vehicle than in a case where the three-dimensional object is not an oncoming vehicle.

5. The driving-assistance device according to claim 1, wherein the information regarding lateral acceleration of the host vehicle includes a current momentum of the host vehicle and an amount of variation in momentum, and wherein the normal travel area is set by a plurality of forward course travel routes along which the host vehicle is capable of traveling, the plurality of forward course travel routes being specified by increasing or decreasing the amount of variation in momentum to or from the current momentum.

6. The driving-assistance device according to claim 5, wherein the electronic control unit is further configured to implement the driving assistance when a length of a travel route having a longest distance among travel routes of the host vehicle included in the travel range is equal to or less than a predetermined threshold, in a case where the electronic control unit determines that the unavoidable three-dimensional object is present in the travel range.

7. A driving-assistance method in which, when a three-dimensional object is present on a forward course of a host vehicle, driving assistance for avoiding a collision between the host vehicle and the three-dimensional object is implemented on a condition that an unavoidable three-dimensional object is present in a normal travel area of the host vehicle wherein the normal travel area includes the forward course, the driving-assistance method comprising:

a setting step of setting the normal travel area specified by a plurality of forward courses along which the host vehicle is capable of traveling, in the vicinity of the host vehicle; and a determination step of determining that the unavoidable three-dimensional object is present in the normal travel area when an avoidance line which is a travel route of the host vehicle for which there is capability of avoiding a collision with the three-dimensional object is not present within the normal travel area, wherein a timing of which the driving assistance is implemented is variable, wherein in the setting step, the normal travel area, which is expanded along a vehicle-width direction as a forward movement of the host vehicle, is changed based on information regarding lateral acceleration of the host vehicle, a degree of width of the normal travel area is adjusted in accordance with a rule which is set in advance on the basis of at least one of a moving state and a type of the three-dimensional object, and the degree of width is set to become smaller as an absolute movement velocity of the three-dimensional object becomes higher so as to decrease a timing of the variable timing of when the driving assistance is implemented.

8. The driving-assistance device according to claim 7, wherein in the setting step, the degree of width is set to become smaller as an absolute movement velocity of the three-dimensional object becomes higher.

* * * * *